United States Patent
Hafner et al.

(10) Patent No.: US 11,952,918 B2
(45) Date of Patent: Apr. 9, 2024

(54) COOLING CIRCUIT FOR A STATOR VANE BRAZE JOINT

(71) Applicant: General Electric Company, Schenectady, NY (US)

(72) Inventors: Matthew Troy Hafner, Honea Path, SC (US); John M. Matthews, Greer, SC (US); Zachary John Snider, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/868,911

(22) Filed: Jul. 20, 2022

(65) Prior Publication Data
US 2024/0026795 A1   Jan. 25, 2024

(51) Int. Cl.
*F01D 9/04* (2006.01)
*F01D 5/18* (2006.01)

(52) U.S. Cl.
CPC .............. *F01D 9/044* (2013.01); *F01D 5/187* (2013.01); *F01D 5/188* (2013.01); *F01D 5/189* (2013.01); *F01D 9/041* (2013.01); *F05D 2230/237* (2013.01); *F05D 2240/81* (2013.01); *F05D 2260/201* (2013.01); *F05D 2260/2214* (2013.01)

(58) Field of Classification Search
CPC .......... F01D 9/044; F01D 5/187; F01D 5/188; F01D 5/189; F01D 9/041; F05D 2230/237; F05D 2240/81; F05D 2260/201; F05D 2260/2214
See application file for complete search history.

(56) References Cited

U.S. PATENT DOCUMENTS

| | | | |
|---|---|---|---|
| 4,288,201 A * | 9/1981 | Wilson | F01D 5/189 415/115 |
| 5,732,468 A | 3/1998 | Galley et al. | |
| 5,797,725 A | 8/1998 | Rhodes | |
| 8,998,566 B2 | 4/2015 | Justl et al. | |
| 9,611,748 B2 | 4/2017 | Kington et al. | |
| 10,280,793 B2 * | 5/2019 | Vu | F01D 9/041 |
| 10,655,482 B2 * | 5/2020 | Freeman | F01D 9/041 |
| 11,466,581 B1 * | 10/2022 | Snider | F01D 9/044 |
| 2001/0021342 A1 * | 9/2001 | Taeck | F01D 5/189 415/12 |
| 2003/0082048 A1 * | 5/2003 | Jackson | B23P 6/005 29/889.1 |

(Continued)

OTHER PUBLICATIONS

European Search Report Corresponding to Application No. 23181097 dated Jan. 4, 2024.

*Primary Examiner* — Brian Christopher Delrue
(74) *Attorney, Agent, or Firm* — Dority & Manning, P.A.

(57) ABSTRACT

A stator vane includes a platform that defines an opening. The stator vane further includes an airfoil that has a leading edge, a trailing edge, a suction side wall, and a pressure side wall. The airfoil extends radially between a base and a tip. At least one of the base or the tip includes a protrusion. The protrusion extends into the opening of the platform such that the platform surrounds the protrusion of the airfoil. The stator vane further includes a braze joint disposed between and fixedly coupling the platform and the protrusion of the airfoil. The stator vane further includes a cooling circuit defined in at least one of the protrusion or the platform to cool the braze joint.

13 Claims, 13 Drawing Sheets

(56) References Cited

U.S. PATENT DOCUMENTS

| | | | |
|---|---|---|---|
| 2003/0082053 A1* | 5/2003 | Jackson | F01D 5/005 |
| | | | 29/889.1 |
| 2007/0163114 A1 | 7/2007 | Johnson | |
| 2011/0058953 A1* | 3/2011 | Simon-Delgado | F01D 5/147 |
| | | | 416/241 R |
| 2014/0219778 A1 | 8/2014 | Boeke et al. | |
| 2014/0234088 A1 | 8/2014 | Brandl | |
| 2014/0334914 A1* | 11/2014 | Brandl | F01D 5/081 |
| | | | 415/115 |
| 2015/0028021 A1 | 1/2015 | Beckel et al. | |
| 2015/0030461 A1 | 1/2015 | Mugglestone | |
| 2016/0003051 A1 | 1/2016 | Slavens et al. | |
| 2016/0053622 A1 | 2/2016 | Farah et al. | |
| 2016/0177749 A1* | 6/2016 | Brandl | F01D 9/044 |
| | | | 416/219 R |
| 2017/0145923 A1* | 5/2017 | Spangler | F01D 5/08 |
| 2017/0312858 A1 | 11/2017 | Eriksson et al. | |
| 2017/0333995 A1 | 11/2017 | Ott et al. | |
| 2018/0010460 A1* | 1/2018 | Tsukimoto | F01D 9/044 |
| 2018/0100403 A1 | 4/2018 | Rawlinson | |
| 2018/0209283 A1 | 7/2018 | Kottilingam et al. | |
| 2018/0347383 A1 | 12/2018 | Varney | |
| 2020/0173288 A1* | 6/2020 | Honkomp | F01D 25/12 |
| 2022/0136397 A1 | 5/2022 | Feie et al. | |

\* cited by examiner

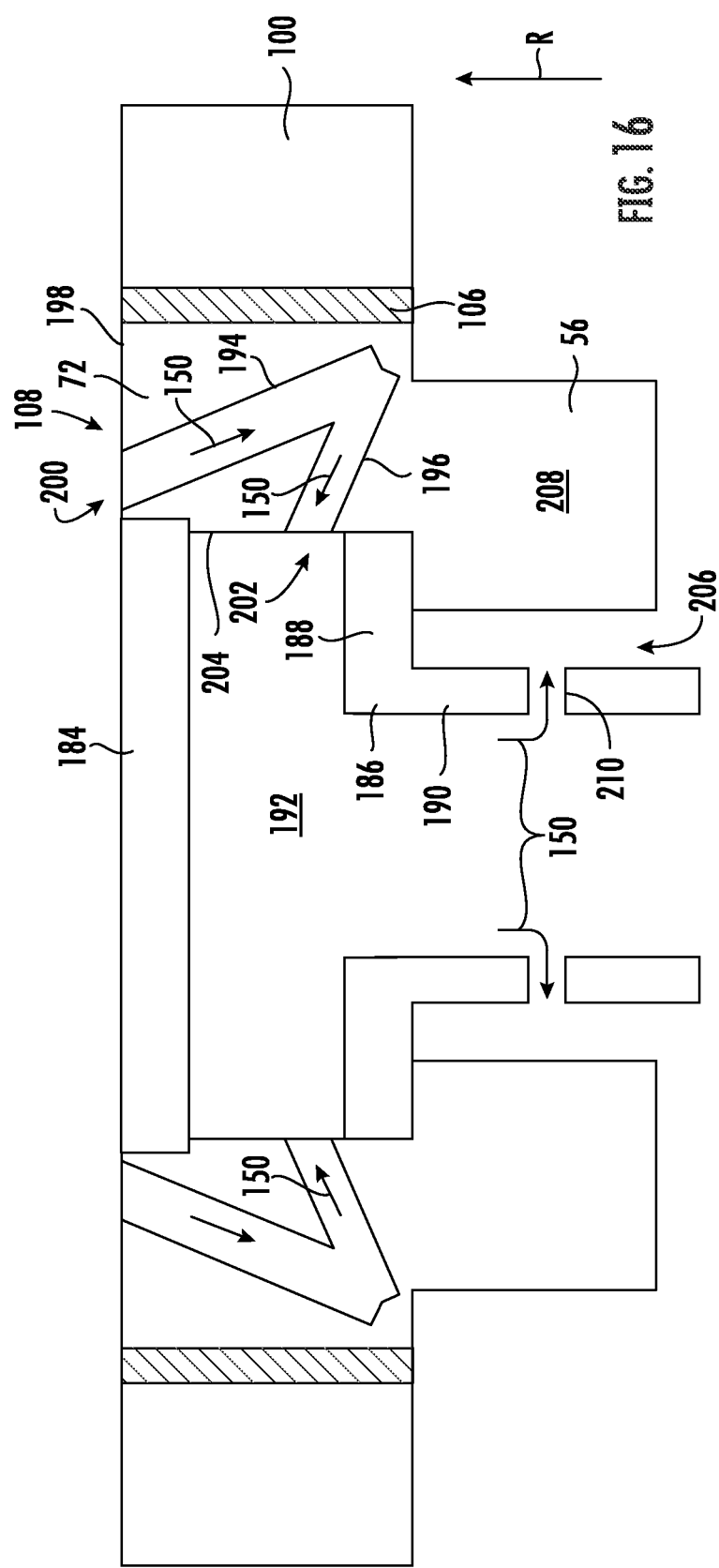

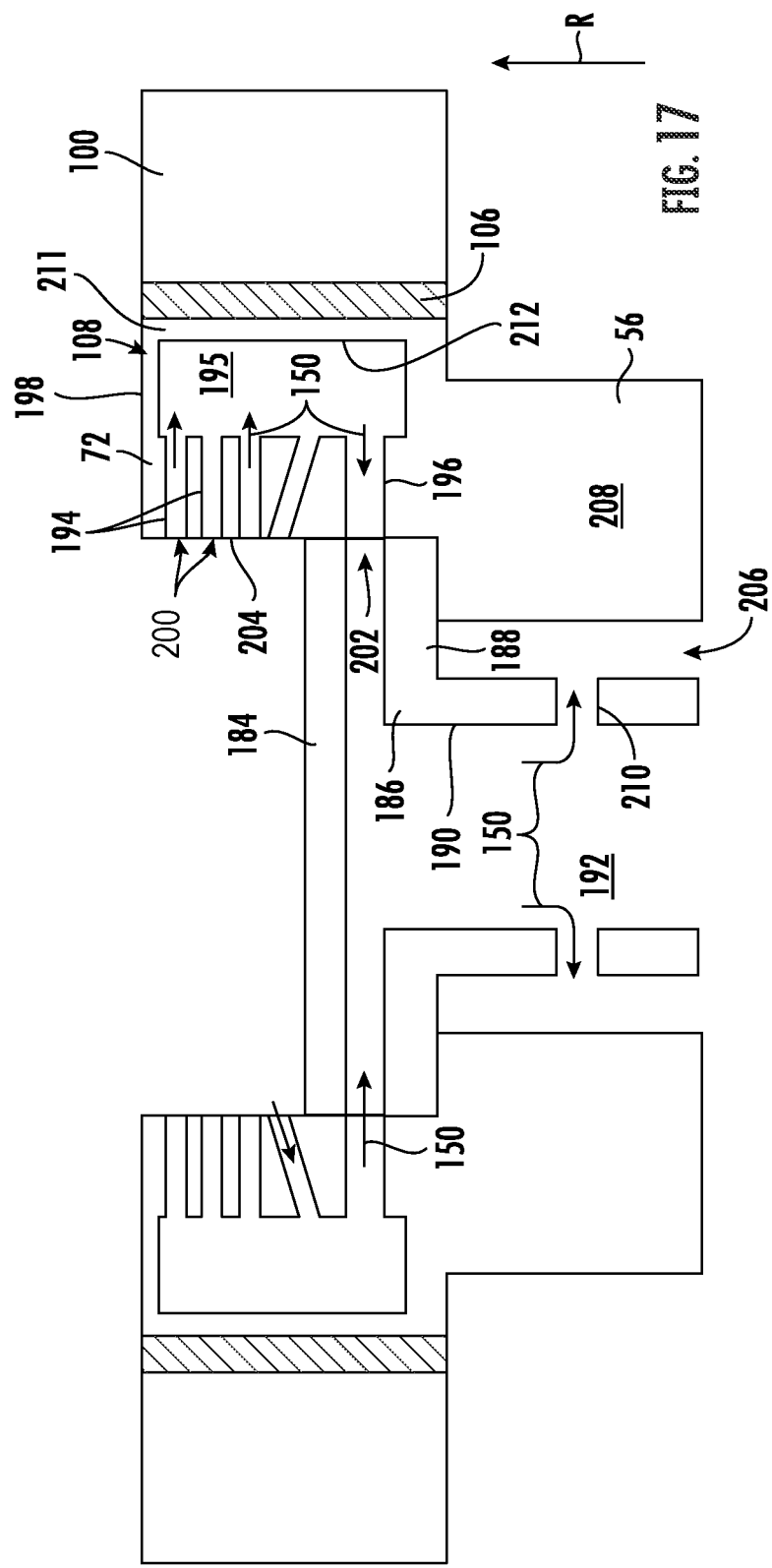

COOLING CIRCUIT FOR A STATOR VANE BRAZE JOINT

FIELD

The present disclosure relates generally to a stator vane for a turbomachine having one or more components joined with a braze joint. Particularly, the present disclosure relates to a cooling circuit for cooling the braze joint of the stator vane.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the gas turbine via the exhaust section.

During operation of the turbomachine, various hot gas path components in the system are subjected to high temperature flows, which can cause the hot gas path components to fail. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

Many complex cooling schemes use small cooling passages, or micro-channels, to deliver cooling fluid through the airfoil. Such cooling schemes present a considerable fabrication challenge for cores and castings, which can significantly increase the manufacturing cost of the hot gas path components using such known near wall cooling systems. To address the fabrication challenges with complex and/or small cooling channels near the component surface, many hot gas path components with such features may be additively manufactured. Additive manufacturing is capable of producing components with intricate and varied cooling features. However, additively manufacturing a hot gas path component, such as a rotor blade or stator vane, as a single component may be costly and time-consuming. Additionally, manufacturing errors in a single portion of the hot gas path component may result in the scrapping of the entire component.

As such, manufacturing a hot gas path component as multiple sub-components may be advantageous. However, due to the complex geometries of the sub-components, joining the sub-components to form the hot gas path component may be difficult. Additionally, the joints formed between the sub-components may be particularly weak and/or fail when exposed to the hot combustion gases produced during operation of the turbomachine and transmitted through the hot gas path through the turbine section.

Accordingly, an improved hot gas path component, having one or more subcomponents joined together and capable of being subject to hot combustion gases without risk of joint failure, is desired and would be appreciated in the art.

BRIEF DESCRIPTION

Aspects and advantages of the stator vanes and turbomachines in accordance with the present disclosure will be set forth in part in the following description, or may be obvious from the description, or may be learned through practice of the technology.

In accordance with one embodiment, a stator vane is provided. The stator vane includes a platform that defines an opening. The stator vane further includes an airfoil that has a leading edge, a trailing edge, a suction side wall, and a pressure side wall. The airfoil extends radially between a base and a tip. At least one of the base or the tip includes a protrusion. The protrusion extends into the opening of the platform such that the platform surrounds the protrusion of the airfoil. The stator vane further includes a braze joint disposed between and fixedly coupling the platform and the protrusion of the airfoil. The stator vane further includes a cooling circuit defined in one of the protrusion or the platform to cool the braze joint.

In accordance with another embodiment, a turbomachine is provided. The turbomachine includes a compressor section, a combustion section, and a turbine section. At least one stator vane is disposed in the turbine section. The at least one stator vane includes a platform that defines an opening. The stator vane further includes an airfoil that has a leading edge, a trailing edge, a suction side wall, and a pressure side wall. The airfoil extends radially between a base and a tip. At least one of the base or the tip includes a protrusion. The protrusion extends into the opening of the platform such that the platform surrounds the protrusion of the airfoil. The stator vane further includes a braze joint disposed between and fixedly coupling the platform and the protrusion of the airfoil. The stator vane further includes a cooling circuit defined in one of the protrusion or the platform to cool the braze joint.

These and other features, aspects, and advantages of the present stator vanes and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present stator vanes and turbomachines, including the best mode of making and using the present systems and methods, directed to one of ordinary skill in the art, is set forth in the specification, which makes reference to the appended figures, in which:

FIG. 16 schematically illustrates an enlarged cross-sectional planar side view of a stator vane, in accordance with embodiments of the present disclosure; and FIG. 17 schematically illustrates an enlarged cross-sectional planar side view of a stator vane, in accordance with embodiments of the present disclosure.

DETAILED DESCRIPTION

Figure 1:
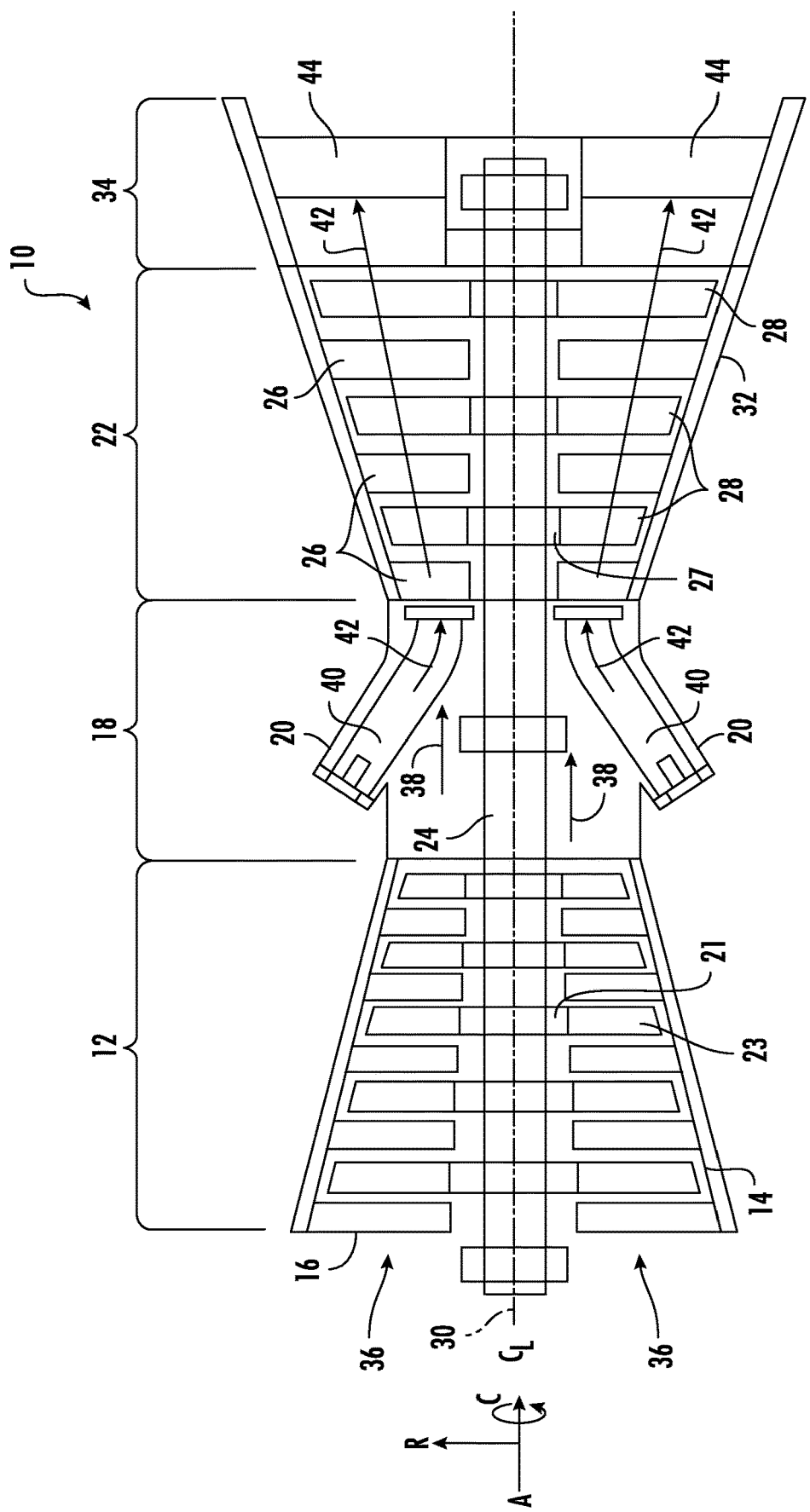
FIG. 1 is a schematic illustration of a turbomachine (e.g., a gas turbine engine), in accordance with embodiments of the present disclosure.

Reference now will be made in detail to embodiments of the present stator vanes and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features that are not expressly listed or that are inherent to such process, method, article, or apparatus. Further, unless expressly stated to the contrary, "or" refers to an inclusive—or and not to an exclusive—or. For example, a condition "A or B" is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine 10 generally includes a compressor section 12. The compressor section 12 includes a compressor 14. The compressor includes an inlet 16 that is disposed at an upstream end of the gas turbine engine 10. The gas turbine engine 10 further includes a combustion section 18 having one or more combustors 20 disposed downstream from the compressor section 12. The gas turbine engine 10 further includes a turbine section 22 (i.e., an expansion turbine) that is downstream from the combustion section 18. A shaft 24 extends generally axially through the gas turbine engine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge).

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stator vanes or stationary nozzles 26 extending radially inward from the outer casing 32. The rotor blades 28 and stator vanes 26 may be arranged in alternating stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work. The spent combustion gases 42 (also called "exhaust gases") exit the turbine section 22 and flow through the exhaust diffuser 34 across a plurality of struts or main airfoils 44 that are disposed within the exhaust diffuser 34.

The gas turbine 10 may define a cylindrical coordinate system having an axial direction A extending along the axial centerline 30, a radial direction R perpendicular to the axial centerline 30, and a circumferential direction C extending around the axial centerline 30.

Figure 2:
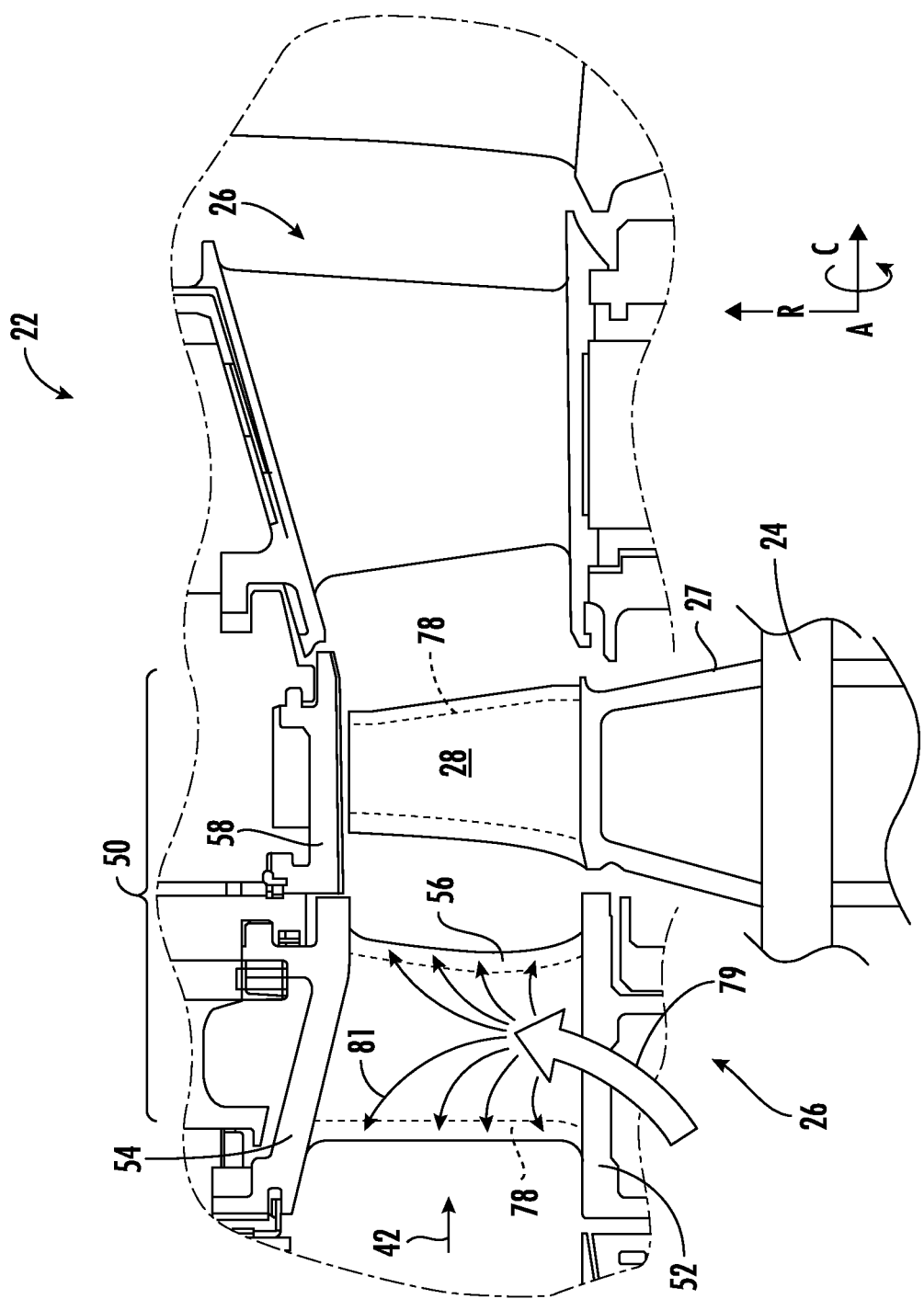
FIG. 2 illustrates a partial cross-sectional side view of a turbine section of a gas turbine engine as shown in FIG. 1, in accordance with embodiments of the present disclosure.

FIG. 2 is a partial cross-sectional side view of the turbine section 22 of the gas turbine engine 10, in accordance with embodiments of the present disclosure. The turbine section 22 may include one or more stages 50 that each include a set of rotor blades 28 coupled to a rotor disk 27 that may be rotatably attached to the shaft 24. The one or more stages 50 may further include a set of stator vanes 26. The stator vane 26 described herein may be employed in a first stage, a second stage, a third stage, or combinations thereof, in which "first" refers to the stage immediately downstream of the combustion section 18.

Each stator vane 26 may include at least one airfoil 56 that extends in the radial direction R between an inner platform or endwall 52 and an outer platform or endwall 54. The circumferentially adjacent outer platforms 54 of each stator vane 26 may be coupled together to form an outer annular ring extending around an inner annular ring of the circumferentially adjacent inner platforms 52 of each stator vane 26. The at least one airfoil 56 may extend between the two annular rings formed by the platforms 52, 54. The turbine section 22 may also include shroud segments 58, which may be disposed downstream of the outer platform 54 to direct combustion gases 42 flowing past the stator vanes 26 to the rotor blades 28.

Structures or components disposed along the flow path of the combustion gases 42 may be referred to as hot gas path components. In one example, the hot gas path component may be the stator vane 26 and/or the rotor blade 28. In some embodiments, to cool the hot gas path components, cooling features, such as impingement sleeves, cooling channels, cooling holes, etc. may be disposed within the hot gas path components, as indicated by the dashed line 78. For example, cooling air as indicated by an arrow 79 may be routed from the compressor section 12 or elsewhere and directed through the cooling features as indicated by arrows 81.

Figure 3:
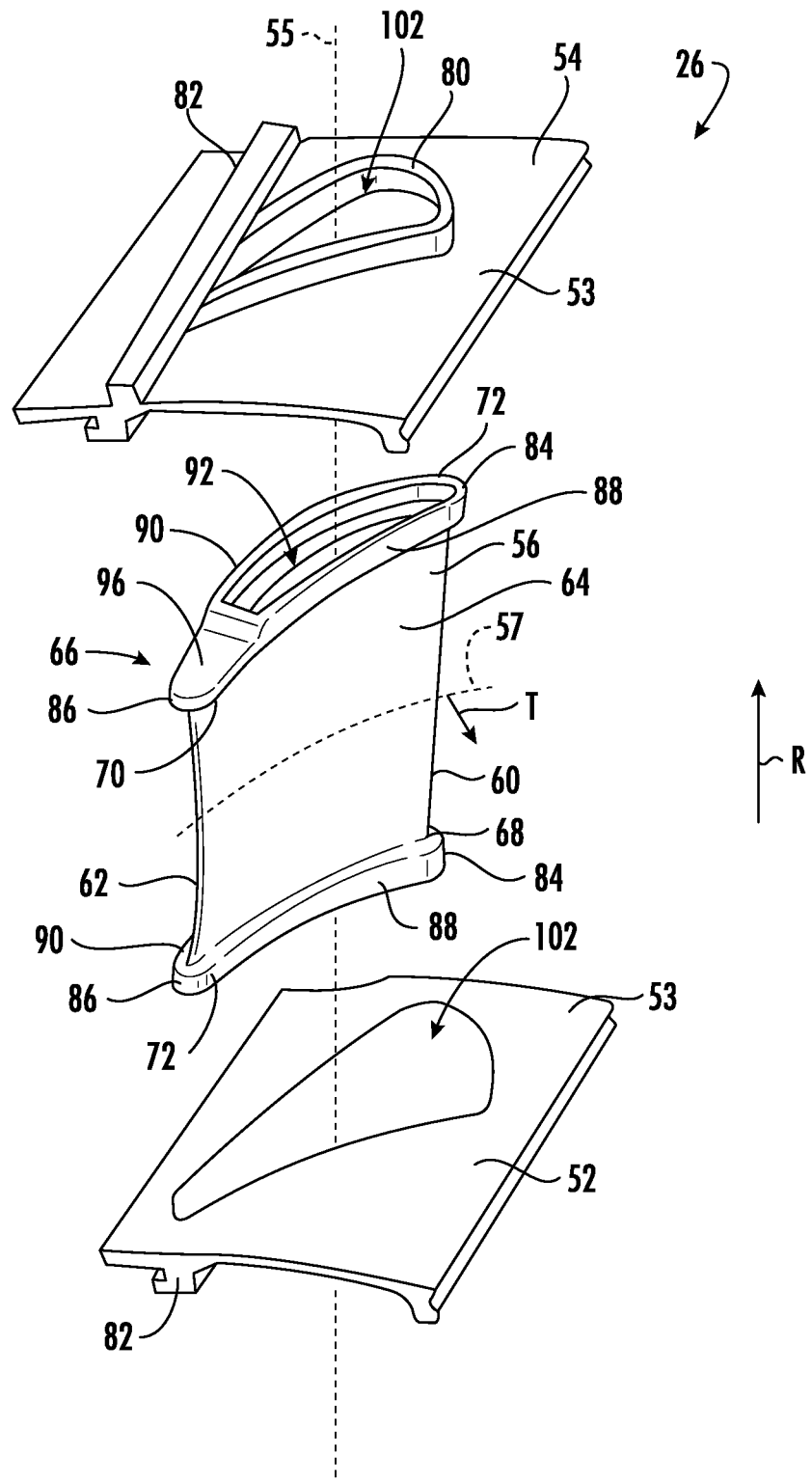
FIG. 3 illustrates an exploded view of a stator vane, in accordance with embodiments of the present disclosure.

FIG. 3 illustrates an exploded view of a stator vane 26, in which the inner platform 52, the outer platform 54, and the airfoil are separated from one another along an axial centerline 55 of the stator vane 26, in accordance with embodiments of the present disclosure. The axial centerline 55 may be generally parallel to the radial direction of the gas turbine 10 when the stator vane 26 is installed in the turbine section 22. As shown, the stator vane 26 may include an inner platform 52, an outer platform 54, and an airfoil 56 extending between the inner platform 52 and the outer platform 54. The airfoil 56 may define a generally aerodynamic shape or contour. For example, the airfoil 56 may include a leading edge 60 that engages a flow of combustion gases and side walls that guide the combustion gases along the airfoil 56 to a trailing edge 62. For example, the airfoil 56 may include a pressure side wall 64 and a suction side wall 66 that each extend from the leading edge 60 to the trailing edge 62. Additionally, the airfoil 56 may extend radially between a base 68 and a tip 70. The base 68 is configured to be coupled to the inner platform 52, and the tip 70 is configured to be coupled to the outer platform 54.

In exemplary embodiments, the inner platform 52, the airfoil 56, and the outer platform 54 may be separate components (e.g., manufactured as separate components) that are brazed or welded to one another via one or more braze joints. For example, in particular embodiments, the inner platform 52, the airfoil 56, and the outer platform 54 may each be separately additively manufactured (e.g., 3D printed) and subsequently joined to one another via braze joints. Forming the stator vane 26 as three separate components advantageously increases the repairability of the stator vane 26. For example, if a portion of the airfoil 56 is damaged, then the entire stator vane 26 would not need to be replaced. Rather, the braze connection could be undone (e.g., via reheating and melting the braze joint) to decouple the airfoil 56 from the platforms 52, 54, and a new airfoil 56 could be employed or the old airfoil could be repaired.

Additionally, in instances where additive manufacturing is used to produce some portion of or all of the stator vane 26, the build (i.e., print) time of the airfoil 56 as a separate component from the inner platform 52 and the outer platform 54 is significantly shorter as compared to the build time of an integral nozzle in which the inner and outer platforms 52, 54 are printed with the airfoil 56. Moreover, forming the stator vane 26 from three separate components permits different manufacturing techniques and/or different materials to be used for the various components.

As shown in FIG. 3, the airfoil 56 may include a camber axis 57, which may extend from the leading edge 60 to the trailing edge 62 and which may be defined halfway between the pressure side wall 64 and the suction side wall 66. The camber axis 57 may be curved and/or contoured to correspond with the curve of the pressure side wall 64 and the suction side wall 66. A transverse direction T may be defined orthogonally with respect to the camber axis 57. As shown in FIG. 3, the stator vane 26 may further include one or more protrusions 72 that extend outwardly from the airfoil 56 in both the radial direction R and in the transverse direction T. For example, the stator vane 26 may include a first protrusion 72 that extends from the airfoil 56 at the base 68 and a second protrusion 72 that extends from the airfoil 56 at the tip 70. Each protrusion 72 may extend generally perpendicularly from the pressure side wall 64 and the suction side wall 66 in the transverse direction T.

Both the inner platform 52 and the outer platform 54 may define an opening 102. The opening 102 may be sized and shaped to correspond with the protrusion 72, such that the protrusion 72 may be inserted into each opening 102 (and subsequently brazed to the respective platform), thereby coupling the airfoil 56 to the inner platform 52 and the outer platform 54. Particularly, the protrusion 72 extending from the base 68 of the airfoil 56 may be inserted into the opening 102 of the inner platform 52 (and subsequently brazed to the inner platform 52), and the protrusion 72 of extending from the tip 70 of the airfoil 56 may be inserted into the opening 102 of the outer platform 54 (and subsequently brazed to the outer platform 54).

Figure 4:
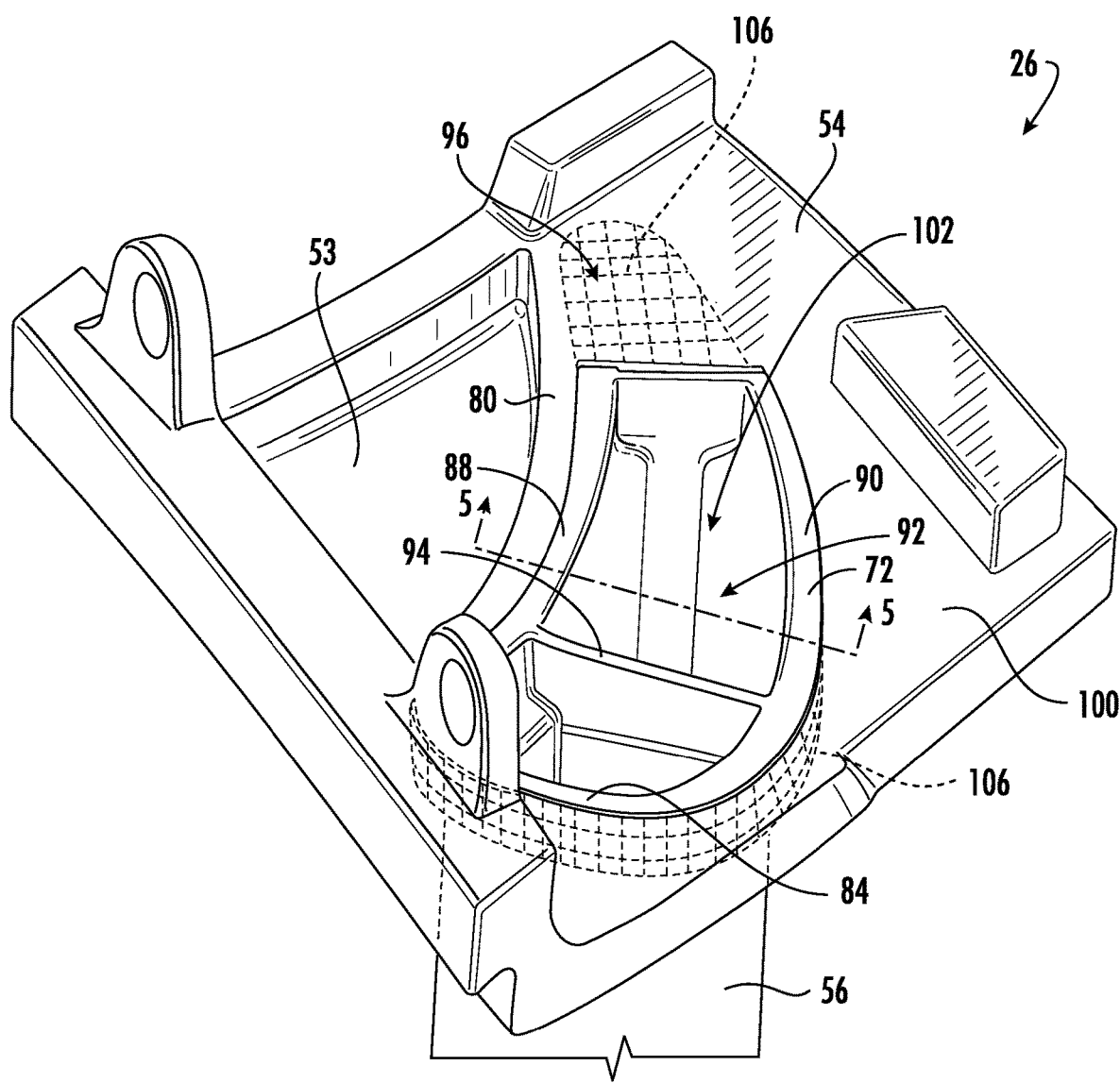
FIG. 4 illustrates an overhead perspective view of a stator vane, in accordance with embodiments of the present disclosure.
Figure 5:
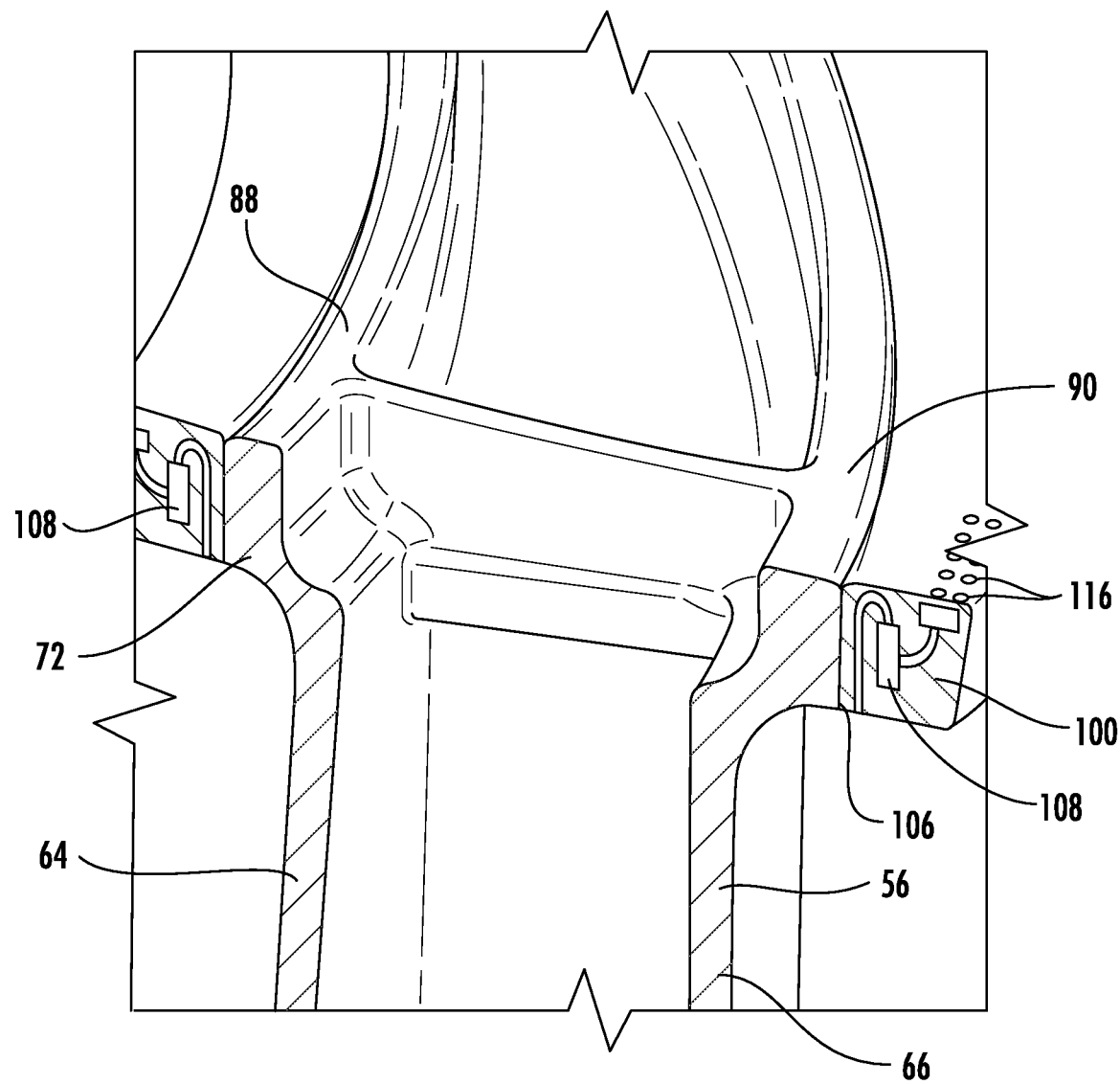
FIG. 5 illustrates a cross-sectional perspective view of a stator vane, in accordance with embodiments of the present disclosure.
Figure 6:
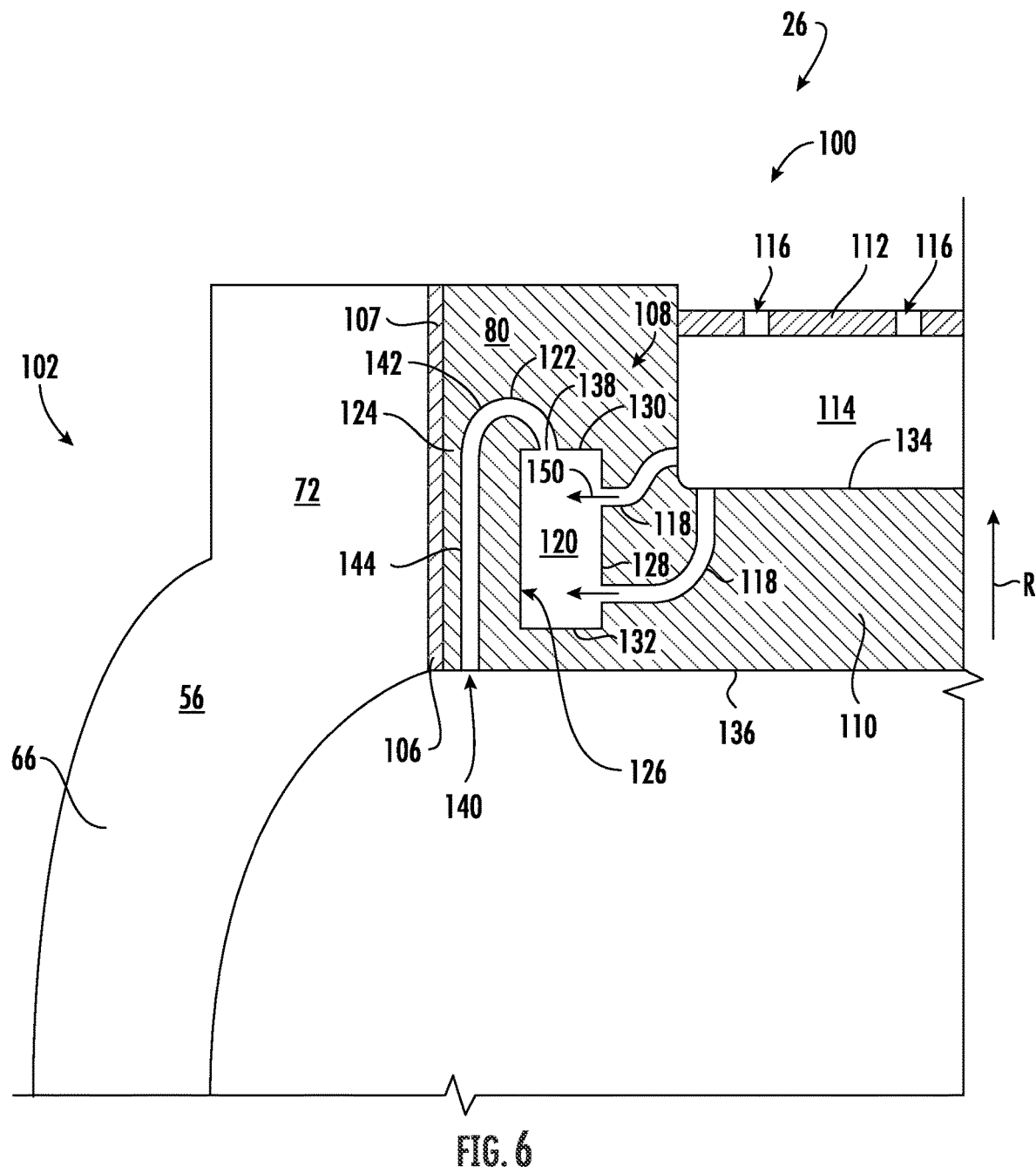
FIG. 6 schematically illustrates a cross-sectional planar view of the stator vane of FIG. 5, in accordance with embodiments of the present disclosure.

For example, the protrusions 72 of the airfoil 56 may be brazenly coupled to the inner and outer platforms 52 and 54 via a braze joint 106 (FIGS. 4 and 5). That is, as shown in FIG. 6, a braze material 107 may be disposed between the protrusion 72 and the boundary of the opening 102 (at both the inner and outer platforms 52 and 54). The entire stator vane 26 may then be placed in a braze oven to melt the braze material 107, and subsequently, the braze material 107 may solidify thereby joining the inner and outer platforms 52 and 54 to a respective protrusion 72 of the airfoil 56. The braze material may contain copper, nickel, silver, gold, aluminum, or other suitable braze metals.

In many embodiments, as shown in FIG. 3, the inner platform 52 and/or the outer platform 54 includes a main body 53. The main body 53 may extend generally perpendicularly to the airfoil 56. The main body 53 of the inner platform 52 may define a radially inward flow boundary for combustion gases in the turbine section 22. Similarly, the main body 53 of the outer platform 54 may define a radially outer flow boundary for combustion gases in the turbine section 22. Additionally, the main body 53 of the inner platform 52 and the outer platform 54 may at least partially define the respective openings 102. In exemplary embodiments, one or both of the inner platform 52 and/or the outer platform 54 may include a raised wall 80 extending radially from the main body 53. The raised wall 80 may at least partially define the opening 102. In many embodiments, the protrusion 72 may be brazenly coupled to the raised wall 80. In some embodiments, the inner and outer platforms 52 and 54 may include one or more rails 82 (which may extend across the main body 53 generally in the circumferential direction C).

In certain embodiments, the protrusion 72 that extends from the base 68 of the airfoil 56 may extend into the opening 102 of the inner platform 52 such that the inner platform 52 surrounds the protrusion 72 of the airfoil 56. Particularly, the main body 53 and/or the raised wall 80 of the inner platform 52 may surround the protrusion 72 extending from the base 68 of the airfoil 56 (i.e., the raised wall 80 extends around a perimeter of the protrusion 72). Similarly, the protrusion 72 that extends from the tip 70 of the airfoil 56 may extend into the opening 102 of the outer platform 54 such that the outer platform 54 surrounds the protrusion 72 of the airfoil 56. Particularly, the main body 53 and/or the raised wall 80 of the outer platform 54 may surround the protrusion 72 extending from the tip 70 of the airfoil 56.

In many embodiments, the protrusion 72 of the airfoil 56 may include a leading edge portion 84, a trailing edge portion 86, a pressure side portion 88, and a suction side portion 90. The leading edge portion 84, the pressure side portion 88, and the suction side portion 90 may at least partially define a cavity 92 that extends into and is further defined in the airfoil 56. The cavity 92 may be exposed by the opening 102 of the platform 54, such that air (e.g., bleed air from the compressor 14) may enter the cavity 92. A rib 94 (FIGS. 4, 10) may extend across the cavity 92, e.g., between the pressure side portion 88 and the suction side portion 90 of the protrusion 72, and between the pressure side wall 64 and the suction side wall 66 of the airfoil 56, to partition the cavity 92 into multiple portions and to provide structural support for the airfoil 56. The protrusion 72 may further include a solid tail 96, which may provide a flat, and/or smooth, surface for additional braze material to bond the protrusion 72 to the platform 54 (as shown by the grid in FIG. 4).

The leading edge portion 84 of the protrusion 72 may extend from the leading edge 60 of the airfoil 56. The trailing edge portion 86 of the protrusion 72 may extend from the trailing edge 62 of the airfoil 56. The pressure side portion 88 of the protrusion 72 may extend from the pressure side wall 64 of the airfoil 56. The suction side portion 90 of the protrusion 72 may extend from the suction side wall 66 of the airfoil 56.

FIG. 4 illustrates an enlarged perspective view of a stator vane 26, in accordance with embodiments of the present disclosure. As shown, the protrusion 72 of the airfoil 56 may extend into the opening 102 of the platform 54 such that the platform 54 surrounds the protrusion 72 of the airfoil 56. A braze joint 106 (as shown by the dashed lines arranged in grids) is disposed between and fixedly couples the platform 54 and the protrusion 72 of the airfoil 56.

FIGS. 5-9 each illustrate a cross-sectional view of a stator vane 26 in accordance with one or more embodiments of the present disclosure. Particularly, FIG. 5 may be a cross-sectional view of a stator vane 26 from along the line 5-5 shown in FIG. 4, and FIG. 6 may be an enlarged planar view of the stator vane 26 in FIG. 5. As shown, the stator vane 26 may include a platform 100 (such as the inner platform 52 or the outer platform 54 shown in FIG. 3). The platform 100 may define an opening 102, and an airfoil 56 may extend into the opening 102 and couple to the platform 100. A braze joint 106 may be disposed between the airfoil 56 and the platform 100, thereby coupling the airfoil 56 to the platform 100. The braze joint 106 may include a braze material 107 that bonds the platform 100 to the airfoil 56. The braze material 107 may have a melting temperature that is lower than a melting temperature of a material from which the airfoil 56 and/or the platform 100 are formed. For example, the braze material 107 may be copper, nickel, silver, gold, aluminum, or combinations thereof. The airfoil 56 and the platform 100 may be formed from a metal material having a high melting temperature, such as nickel and cobalt alloys or other materials.

In exemplary embodiments, the stator vane 26 may include a cooling circuit 108 defined in one of the airfoil 56 and/or the platform 100 to cool the braze joint 106 (e.g., during operation of the gas turbine engine 10). In some embodiments, the cooling circuit 108 may be defined in one or both of the protrusion 72 and/or the airfoil 56. In other embodiments, the cooling circuit 108 may be defined in the platform 100, such as in one or more of the main body 53, the raised wall 80, and/or the rail 82 described above with reference to FIG. 3. The cooling circuit 108 may be in fluid communication with the compressor section 12, such that the cooling circuit 108 may utilize a flow of compressed air from the compressor to cool the braze joint 106.

In many embodiments, the platform 100 may include an inner wall 110 and an outer wall 112, and the raised wall 80 may extend between the inner wall 110 and the outer wall 112. In exemplary embodiments, as shown, the braze joint 106 may be disposed between, and fixedly couple, the raised wall 80 of the platform 100 to the protrusion 72 of the airfoil 56. In many embodiments, an inlet plenum 114 may be defined between the inner wall 110, the outer wall 112, and the raised wall 80. One or more inlet apertures 116 may be defined in the outer wall 112 to allow compressed air to enter the inlet plenum 114 (e.g., from a compressed air source such as bleed air from the compressor section 12). The inner wall 110 may define an outer surface 134 partially defining the inlet plenum 114 and an inner surface 136 partially defining a hot gas path boundary of the combustion gases. In other words, the inner surface 136 may be exposed to the combustion gases during operation of the gas turbine 10.

Figure 7:
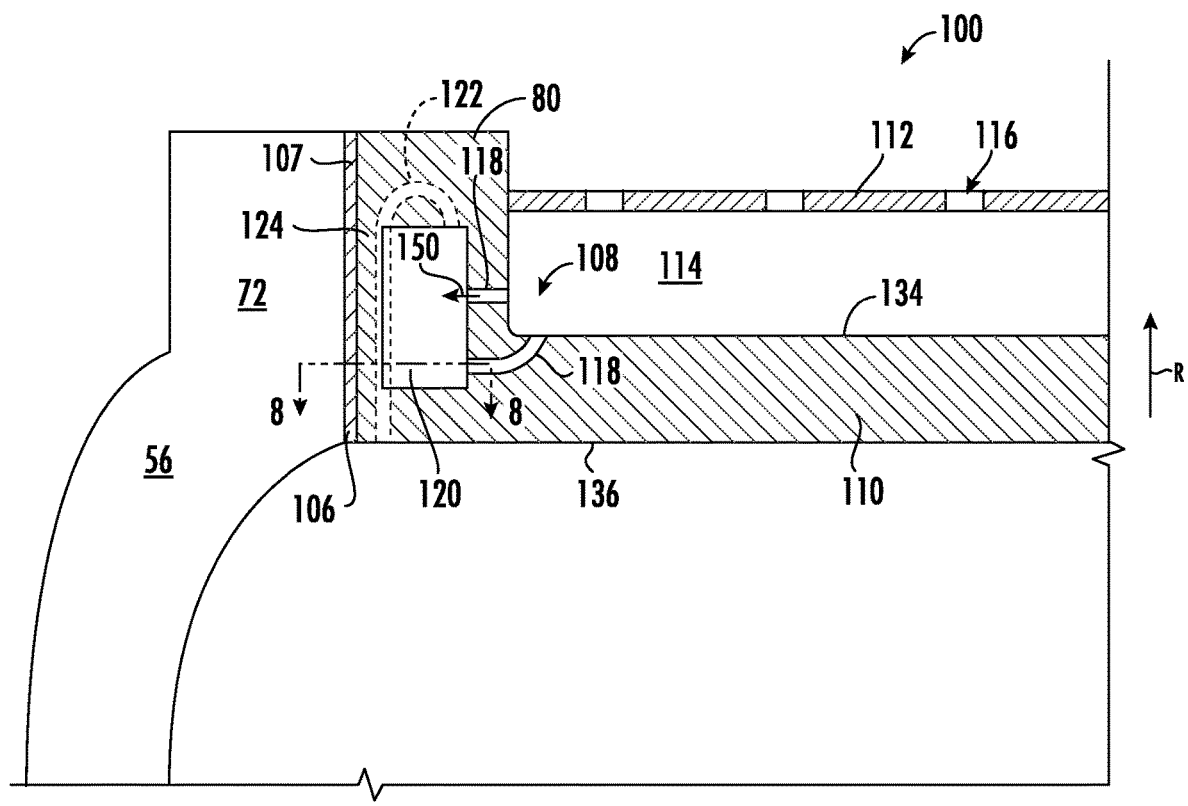
FIG. 7 schematically illustrates a cross-sectional planar view of a stator vane, in accordance with embodiments of the present disclosure.

In many embodiments, as shown in FIGS. 6 and 7, the cooling circuit 108 may include one or more inlet channels 118, a plenum 120, and one or more outlet channels 122 each defined in the raised wall 80 and/or the inner wall 110 of the platform 100. The one or more inlet channels 118 may extend from the inlet plenum 114 to a plenum 120. In some embodiments, the plenum 120 may be annular, such that it surrounds the protrusion 72 (thereby surrounding the axial centerline 55 shown in FIG. 3). Each inlet channel 118 of the one or more inlet channels 118 may be sized and oriented to direct coolant or air 150 to impinge upon a joint boundary wall 124. The joint boundary wall 124 may form a portion of the raised wall 80 and may be disposed between the plenum 120 and the braze joint 106. For example, the joint boundary wall 124 of the raised wall 80 may be oriented generally radially, and the inlet channel 118 may include an axially oriented portion immediately upstream of an outlet of the inlet channel 118, such that coolant exits the inlet channel 118 traveling generally axially (or perpendicularly to the joint boundary wall 124). The air 150 may then impinge upon, or strike, the joint boundary wall 124, thereby transferring heat from the joint boundary wall 124 to the air 150. Because the joint boundary wall 124 may be a portion of the raised wall 80, the joint boundary wall 124 may both contact the braze joint 106 and partially define the plenum 120.

Particularly, inlet channels 118 may be sized and oriented to direct the air 150 in discrete jets to impinge upon the joint boundary wall 124. The discrete jets of air 150 may impinge (or strike) an impingement surface 126 of the joint boundary wall 124 and cool the impingement surface 126, which allows for heat transfer from the joint boundary wall 124 and the braze joint 106 to the air. The impingement surface 126 may partially define a boundary of the plenum 120. For example, the inlet channels 118 may include an exit portion that extends generally perpendicularly to the impingement surface 126 of the joint boundary wall 124, such that the discrete jets of air 150 exiting the inlet channels 118 are perpendicular to the surface upon which they strike, e.g., the impingement surface 126 of the joint boundary wall 124. Once the discrete jets of air have impinged upon the impingement surface 126, they may be referred to as "post-impingement air" and/or "spent cooling air" because the air has undergone an energy transfer and therefore has different characteristics (e.g., higher temperature and lower pressure than prior to impingement).

In various embodiments, the plenum 120 may be generally rectangularly shaped in cross-section. For example, the plenum 120 may be bounded by an upstream surface 128 (with respect to the flow of coolant thought the cooling circuit 108), the impingement surface 126 opposite the upstream surface 128, a radially outer surface 130, and a radially inner surface 132. The radially outer surface 130 and the radially inner surface 132 may be spaced apart (e.g., radially spaced apart) and may each extend generally parallel to one another. The impingement surface 126 and the upstream surface 128 may be spaced apart from one another, generally parallel to one another and may each extend generally radially.

In exemplary embodiments, the cooling circuit 108 may include one or more outlet channels 122 defined in the joint boundary wall 124 (e.g., defined partially in the raised wall 80 and defined partially in the inner wall 110) and in fluid communication with the plenum 120. The outlet channel 122 may extend from an inlet 138 defined in the radially outer surface 130 and in fluid communication with the plenum 120 to an outlet 140 defined in the inner surface 136 of the inner wall 110. The one or more outlet channels 122 may include at least a portion that extends between the impingement surface 126 and the braze joint 106 to cool the braze joint 106 (and the braze material 107). For example, the one or more outlet channels 122 may include a U-shaped portion 142 and a straight portion 144 (which may extend radially). The U-shaped portion 142 may extend from the inlet 138 defined in the radially outer surface 130 to the straight portion 144. The straight portion 144 may be disposed axially between the impingement surface 126 and the braze joint 106, and the straight portion 144 of the outlet channel 122 may extend from the U-shaped portion 142 to an outlet 140 defined in the inner surface 136 of the inner wall 110. In exemplary implementations, the air 150 exiting the outlet 140 of the outlet channel 122 may film cool the inner surface 136 (and/or the airfoil 56).

Figure 8:
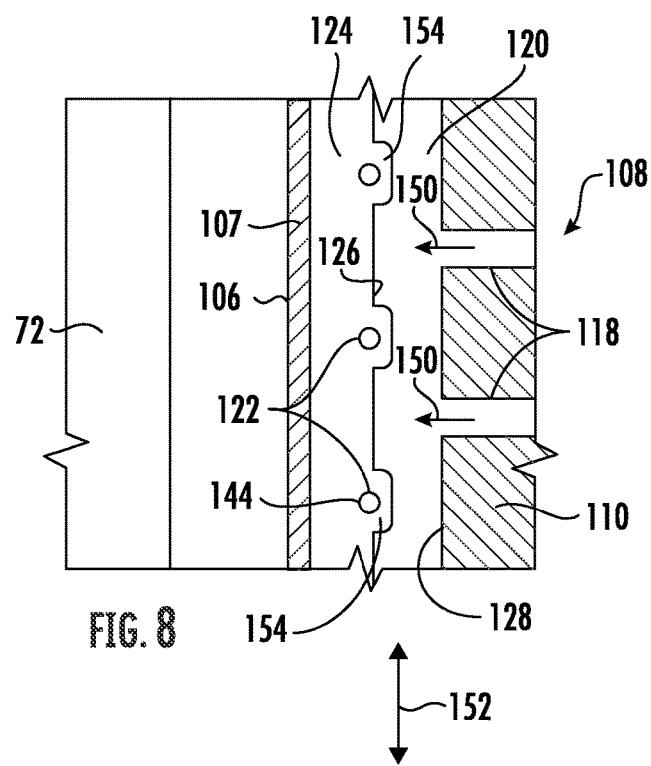
FIG. 8 schematically illustrates a cross-sectional planar view of a stator vane from along the line 8-8 shown in FIG. 7, in accordance with embodiments of the present disclosure.

Referring now specifically to the embodiment shown in FIGS. 7 and 8, the one or more outlet channels 122 and the one or more inlet channels 118 may be alternately arranged. For example, the one or more outlet channels 122 and the one or more inlet channels 118 may not lie in the same plane defined by the radial direction R and the direction of the cooling air 150 exiting the inlet channel 118. Particularly, each outlet channel 122 of the one or more outlet channels 122 may be disposed between two inlet channels 118 of the one or more inlet channels 118. Similarly, each inlet channel 118 of the one or more inlet channels 118 may be disposed between two outlet channels 122 of the one or more outlet channels 122. Stated otherwise, the inlet channels 118 and the outlet channels 122 may be spaced apart from one another with respect to a direction 152 that is perpendicular to the cooling air 150 exiting the inlet channel 118. In some embodiments, the direction 152 may be generally parallel to the upstream surface 128 partially defining plenum 120. Particularly, the direction 152 may extend along a perimeter of the protrusion 72. For example, in many embodiments, each outlet channel 122 of the one or more outlet channels 122 may be offset from each inlet channel 118 (e.g., each neighboring inlet channel 118) of the one or more inlet channels 118 both radially (as shown in FIG. 7) and in the direction 152 that extends along a perimeter of the protrusion 72 (as shown in FIG. 8).

As shown in FIG. 8, the joint boundary wall 124 may include one or more projections 154 extending from the impingement surface 126. For example, the projections 154 may extend into the plenum 120 towards the upstream surface 128. In exemplary embodiments, the outlet channels 122 may be at least partially defined in the projections 154 of the joint boundary wall 124. Particularly, the straight portion 144 of the outlet channels 122 may be defined in the projections 154 of the joint boundary wall 124. Each of the projections 154 may have a semi-circular cross-sectional shape (or other suitable cross-sectional shape). An advantage of the embodiment of FIGS. 7 and 8 is that the impingement surface 126 and the straight portion 144 of the outlet channel 122 may be disposed in closer proximity to the braze joint 106, thereby improving the cooling of the braze joint 106.

Figure 9:
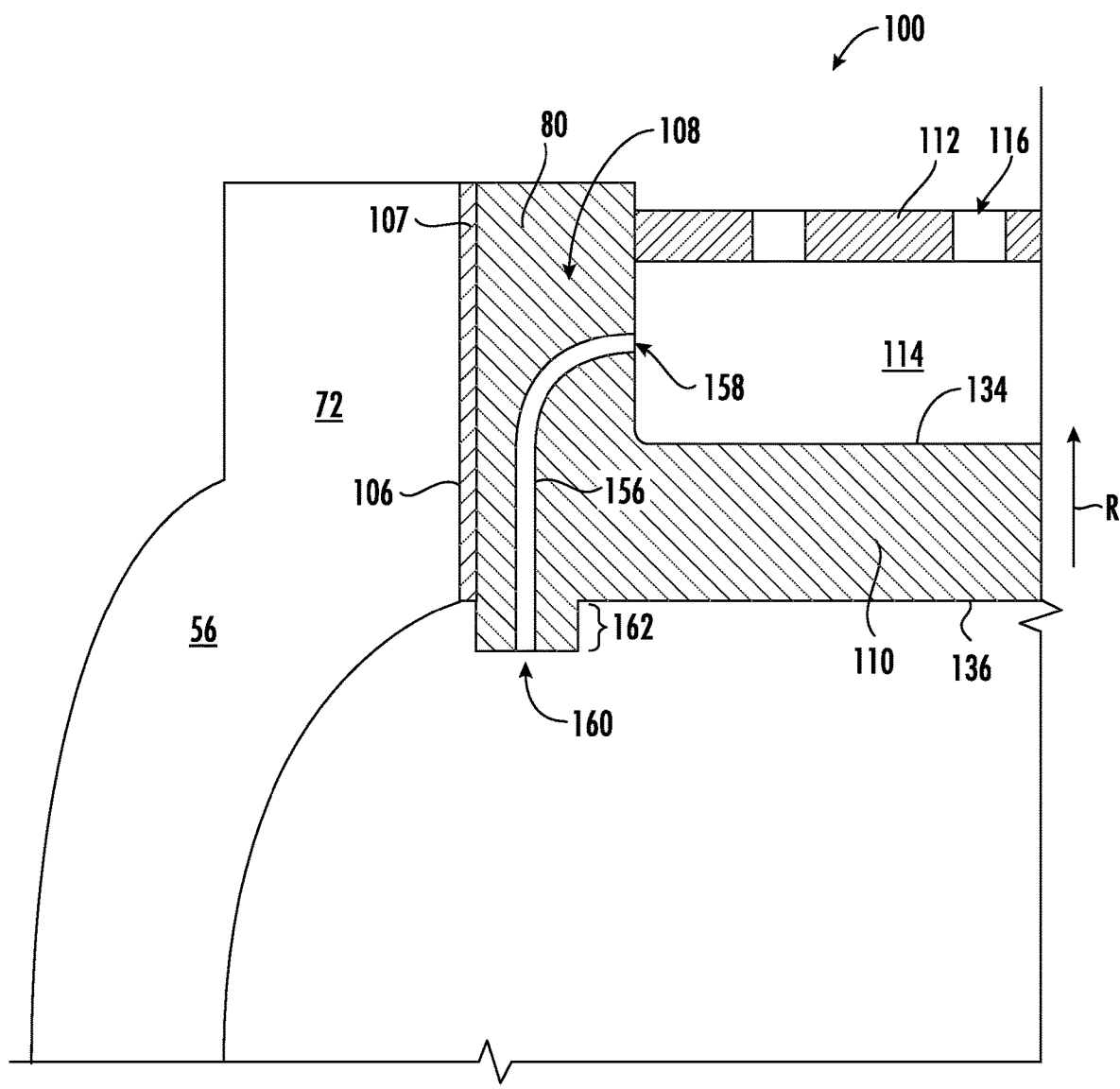
FIG. 9 schematically illustrates a cross-sectional planar view of a stator vane, in accordance with embodiments of the present disclosure.

As shown in FIG. 9, in some embodiments, the cooling circuit 108 may include a direct channel 156 extending between an inlet 158 defined in the raised wall (or in the inner wall 110 in other embodiments) to an outlet 160. In such embodiments, the direct channel 156 may be disposed proximate to the braze joint 106 to provide convective cooling to the braze joint 106. Additionally, as shown in FIG. 9, the platform 100 may further include a raised outlet portion 162 extending radially inward from the inner surface 136 of the inner wall 110 of the platform 100 in an area radially inward of the raised wall 80 and proximate to the braze joint 106. The direct channel 156 may be defined at least partially in the raised outlet portion 162. For example, the outlet 160 of the direct channel 156 may be defined in the raised outlet portion 162 of the platform 54. The raised outlet portion 162 may advantageously prevent any melted braze material 107 from wicking or sliding into the direct channel 156 during braze application and brazing. As should be appreciated, the raised outlet portion 162 may be incorporated into one or more of the outlet channels 122 described above with reference to FIGS. 6 through 8, in order to prevent braze material 107 from entering the cooling circuit 108 during braze application and brazing.

Figure 10:
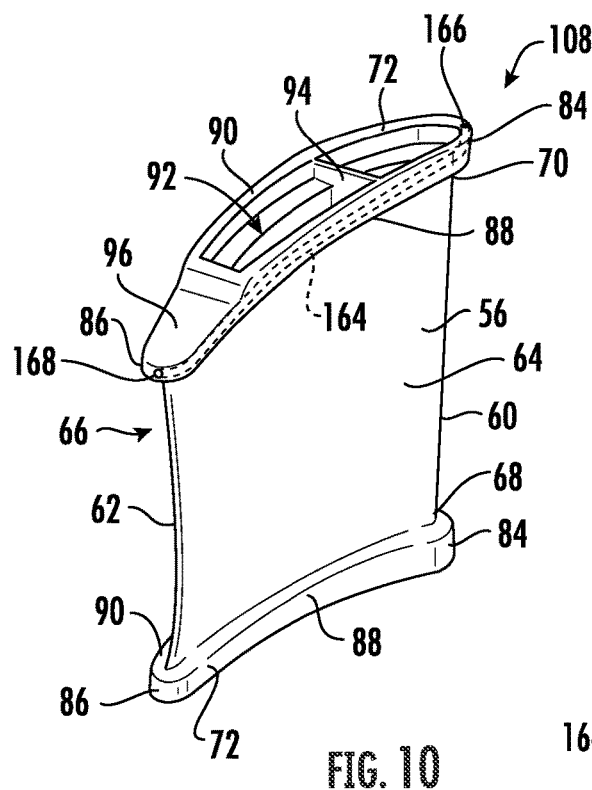
FIG. 10 illustrates a perspective view of a portion of a stator vane, in accordance with embodiments of the present disclosure.
Figure 11:
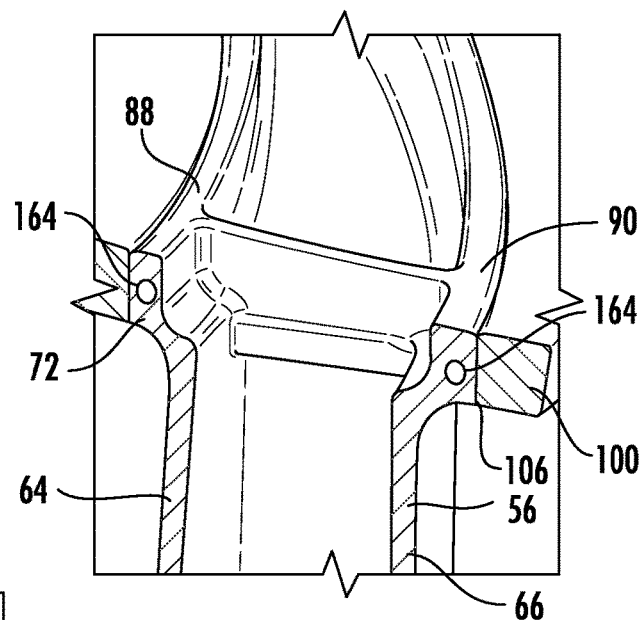
FIG. 11 illustrates a cross-sectional perspective view of a stator vane, in accordance with embodiments of the present disclosure.
Figure 12:
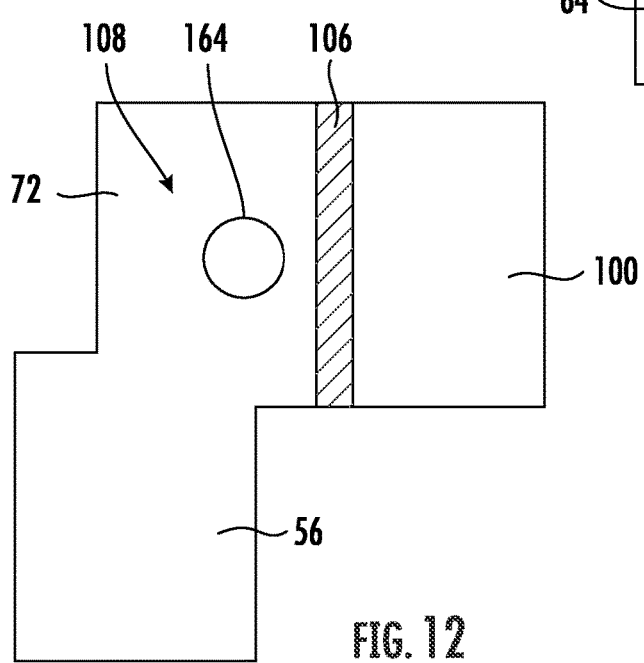
FIG. 12 illustrates an enlarged cross-sectional planar view of the stator vane of FIG. 11, in accordance with embodiments of the present disclosure.

Referring now to FIGS. 10 through 12, the cooling circuit 108 may be defined in the protrusion 72 of the airfoil 56 rather than (or in addition to) the cooling circuit 108 being defined in the platform(s) 52, 54, in accordance with embodiments of the present disclosure. In such embodiments, the cooling circuit 108 may be disposed in the protrusion 72 proximate the braze joint 106, to provide cooling (e.g., convective cooling) thereto during operation of the gas turbine 10. FIG. 10 illustrates a perspective view of an airfoil 56 decoupled from the inner and outer platforms 52, 54, in order to show details of the cooling circuit 108. FIG. 11 illustrates a cross-sectional perspective view of the stator vane 26 having a cooling circuit 108 defined in the protrusion 72. FIG. 12 illustrates an enlarged cross-sectional view of the stator vane 26 shown in FIG. 11.

As shown, the cooling circuit 108 may include a cooling passage 164 defined in the protrusion 72 and extending between an inlet 166 and an outlet 168. Particularly, the inlet 166 may be defined in a leading edge portion 84 of the protrusion 72, and the outlet may be defined in a trailing edge portion 86 of the protrusion 72. In this way, the passage may extend through the pressure side portion 88 (and/or the suction side portion 90, as shown in FIG. 11) of the protrusion from the inlet 166 to the outlet 168. The cooling passage 164 along the pressure side portion 88 may have its own inlet 166 and its own outlet 168 relative to the cooling passage 164 along the suction side portion 90, or the cooling passages 164 along the pressure side portion 88 and the suction side portion 90 may share a common inlet 166 and/or a common outlet 168. Additionally, while a single cooling passage 164 is shown along each of the pressure side portion 88 and the suction side portion 90, it should be understood that more than one cooling passage 164 may be disposed in one or both of the pressure side portion 88 and the suction side portion 90 (e.g., as radially stacked passages).

While FIGS. 10 through 12 illustrate a cooling passage 164 defined in the protrusion 72 at the tip 70 of the airfoil 56, it should be appreciated that the cooling passage 164 may alternatively (or additionally) be employed in the protrusion 72 at the base 68 of the airfoil 56. Because the braze joint 106 bonds the protrusion 72 to the outer platform 54, and the cooling passage 164 extends through the protrusion 72 proximate the braze joint 106, the cooling passage 164 may advantageously provide convective cooling to the braze joint 106 during operation of the gas turbine 10. Any aspects of the cooling passage 164 described above with respect to tip 70 of the airfoil 56 are equally applicable to cooling passage(s) 164 in the base 68 of the airfoil 56.

Figure 13:
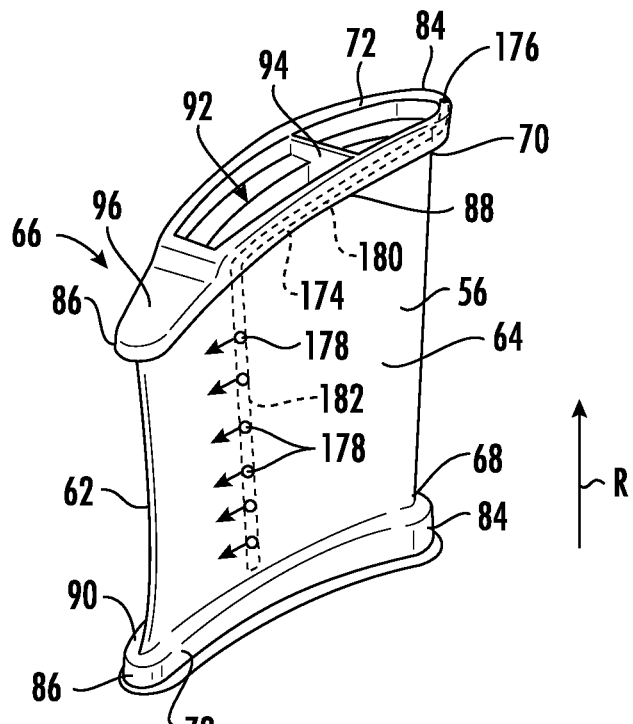
FIG. 13 illustrates a perspective view of a portion of a stator vane, in accordance with embodiments of the present disclosure.
Figure 14:
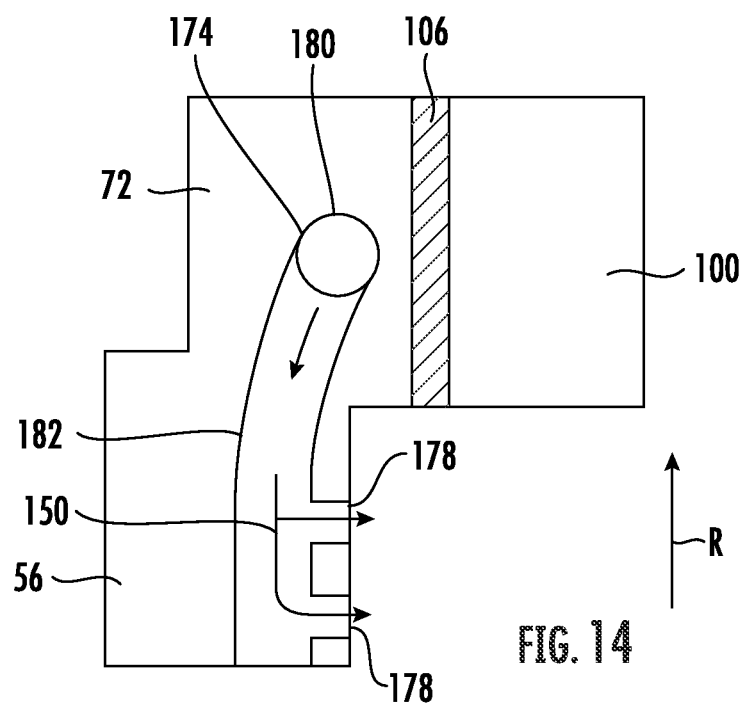
FIG. 14 illustrates an enlarged cross-sectional planar view of the stator vane of FIG. 13, in accordance with embodiments of the present disclosure.

Referring now to FIGS. 13 and 14, cooling circuit 108 may be defined in the protrusion 72 rather than (or in addition to) the cooling circuit 108 being defined in the platform(s) 52, 54, in accordance with embodiments of the present disclosure. In such embodiments, the cooling circuit 108 may be disposed in the protrusion 72 proximate the braze joint 106, to provide convective cooling thereto during operation of the gas turbine 10. FIG. 12 illustrates a perspective view of an airfoil 56 decoupled from the inner platforms 52, 54, in order to show details of the cooling circuit 108, and FIG. 14 illustrates an enlarged cross-sectional view of the stator vane shown in FIG. 13.

As shown, the cooling circuit 108 may include a cooling passage 174 defined in the protrusion 72 and extending between an inlet 176 and a plurality of outlets 178. Particularly, the inlet 166 may be defined in a leading edge portion 84 of the protrusion 72, and the plurality of outlets 178 may be defined in one of the pressure side wall 64 or the suction side wall 66. In this way, the cooling passage 174 may include a first portion 180 that extends through the pressure side portion 88 (or the suction side portion 90) of the protrusion 72 and a second portion 182 that extends through the pressure side wall 64 (or the suction side wall 66) of the airfoil 56. The second portion 182 of the cooling passage 174 may be oriented generally radially and may be disposed closer to the trailing edge 62 than the leading edge 60 of the airfoil 56.

As shown in FIG. 14, the plurality of outlets 178 may be radially spaced apart from one another and may extend through the pressure side wall 64 (or the suction side wall 66). In this way, the first portion 180 of the cooling passage 174 may provide convective cooling to the braze joint 106, and the second portion 182 of the cooling passage 174 may provide film cooling to one of the pressure side wall 64 and/or the suction side wall 66 via air 150 exiting the plurality of outlets 178.

Figure 15:
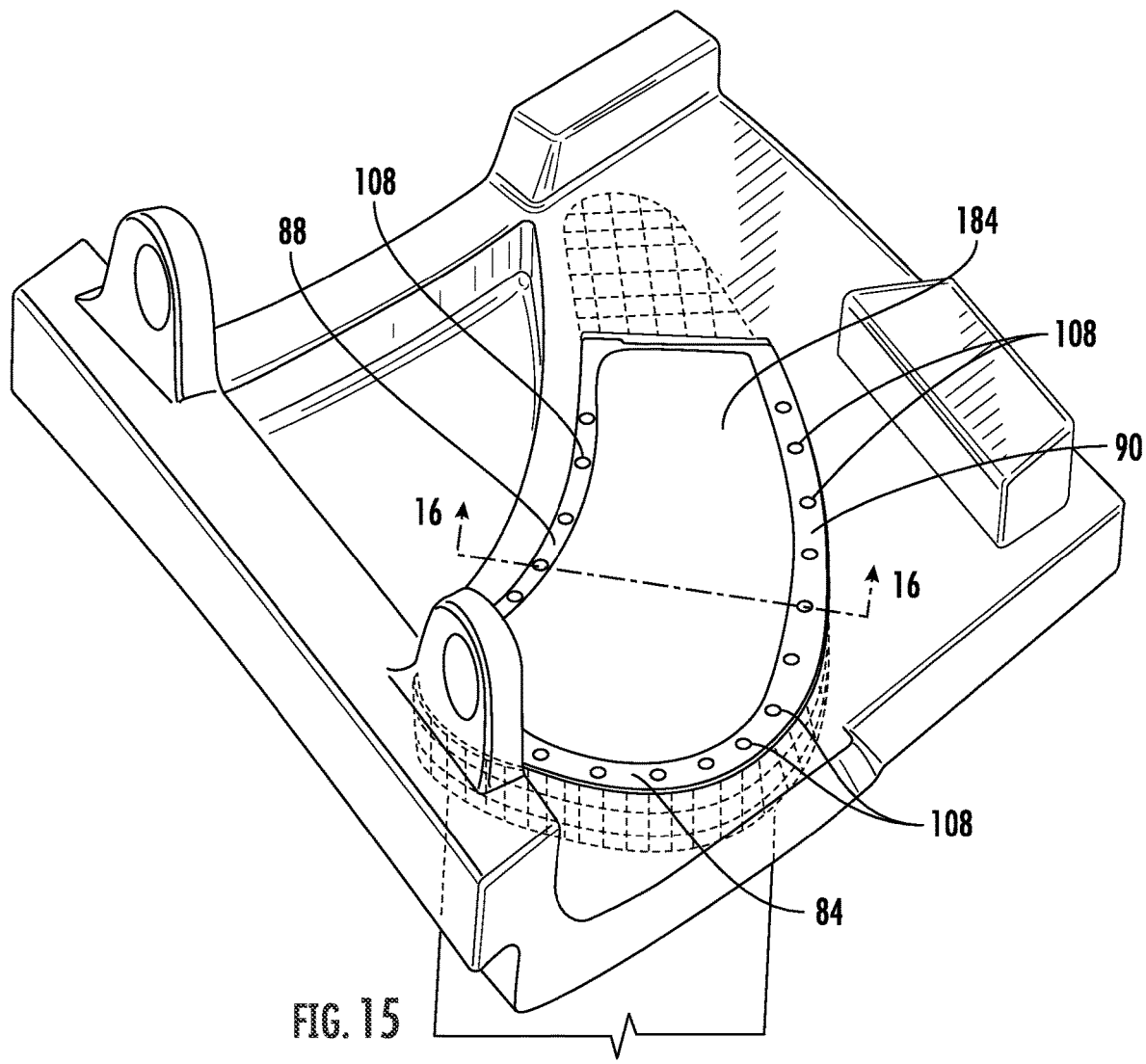
FIG. 15 illustrates an overhead perspective view of a stator vane in accordance with embodiments of the present disclosure.

Referring now to FIGS. 15 through 17, the stator vane may further include a cap 184 and an insert 186. The cap 184 may be coupled to the protrusion 72 and may extend across the cavity 92 defined by the protrusion 72 and the airfoil 56. For example, the cap 184 may provide a barrier and/or boundary for air outside of the cavity 92. The cap may be a generally flat plate that is shaped as an airfoil (e.g., an airfoil without a trailing edge). For example, the cap 184 may include a leading edge that contacts the leading edge portion 84 of the protrusion 72, a pressure side that contacts the pressure side portion 88 of the protrusion 72, and a suction side that contacts the suction side portion 90 of the protrusion 72. The insert 186 may be coupled to the protrusion 72 and may extend into the cavity 92. The insert may include a first portion 188 that extends generally parallel to the cap 184 and a second portion 190 that extends generally perpendicularly to the cap 184 (e.g., the second portion 190 may extend radially into the cavity 92).

In exemplary embodiments, the cap 184 and the insert 186 may define an outlet plenum 192 within the cavity 92 of the stator vane 26. The cooling circuit 108 may be in fluid communication with the outlet plenum 192. For example, as shown in FIGS. 15 through 17, the cooling circuit 108 may be defined in the protrusion 72 rather than (or in addition to) the cooling circuit 108 being defined in the platform(s) 52, 54, in accordance with embodiments of the present disclosure. In such embodiments, the cooling circuit 108 may be disposed in the protrusion 72 proximate the braze joint 106, to provide convective cooling thereto during operation of the gas turbine engine 10. As shown in FIG. 16, the cooling circuit 108 may include an inlet channel 194 and an outlet channel 196. The inlet channel 194 may extend from an inlet 200 defined in a radially outer surface 198 of the protrusion 72, towards the braze joint 106, to the outlet channel 196. The outlet channel 196 may extend from the inlet channel 194 to an outlet 202 defined in an interior surface 204 of the protrusion 72. The outlet 202 may exhaust air from the cooling circuit 108 into the outlet plenum 192.

In various embodiments, as shown collectively in FIGS. 15 and 16, the protrusion 72 may include a plurality of cooling circuits 108 each in fluid communication with the outlet plenum 192. For example, each cooling circuit 108 may extend from an inlet 200 defined in the radially outer surface 198 of the protrusion 72 to the outlet 202 defined in the interior surface 204 of the protrusion 72. For example, as shown in FIG. 15, the plurality of cooling circuits 108 may be spaced apart from one another (e.g., equally or unequally spaced apart) around a perimeter of the protrusion 72. Particularly, the inlets 200 of each cooling circuit 108 of the plurality of cooling circuits 108 may be spaced apart from one another around the perimeter of the protrusion 72.

In many embodiments, an annular plenum 206 may be defined between the insert 186 and a wall 208 (e.g., the pressure side wall 64 and/or the suction side wall 66) of the airfoil 56. For example, the insert 186 may be annular, such that the annular plenum 206 is defined around the entire perimeter of the airfoil 56 between the wall 208 and the insert 186. In exemplary embodiments, the annular plenum 206 may be fluidly coupled to the outlet plenum 192 via an insert aperture 210. For example, the insert aperture 210 may be defined in the second portion 190 of the insert 186 to fluidly couple the outlet plenum 192 to the annular plenum 206, thereby providing air to the annular plenum 206 for cooling the wall 208 during operation of the turbomachine.

Alternatively, or additionally, as shown in FIG. 17, the cooling circuit 108 may include a plurality of inlet channels 194, a plenum 195, and an outlet channel 196. A joint boundary wall 211 may be disposed between the plenum 195 and the braze joint 106, and an impingement surface 212 of the joint boundary wall 211 may partially define the plenum 195. Each inlet channel 194 may extend from an inlet 202 defined in the interior surface 204 of the protrusion 72 to the plenum 195, and the outlet channel 196 may extend from the plenum 195 to an outlet defined in the interior surface 204. Particularly, inlet channels 194 may be sized and oriented to direct the air in discrete jets to impinge upon an impingement surface 212. The discrete jets of air may impinge (or strike) an impingement surface 212 which allows for heat transfer between the air and the braze joint 106.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

Further aspects of the invention are provided by the subject matter of the following clauses:

According to a first aspect, a stator vane comprises: a platform defining an opening; an airfoil having a leading edge, a trailing edge, a suction side wall, and a pressure side wall, the airfoil extending radially between a base and a tip, wherein at least one of the base or the tip includes a protrusion, the protrusion extending into the opening of the platform such that the platform surrounds the protrusion of the airfoil; a braze joint disposed between and fixedly coupling the platform and the protrusion of the airfoil; and a cooling circuit defined in at least one of the protrusion or the platform to cool the braze joint.

The stator vane as in any of the preceding clauses, wherein the cooling circuit comprises one or more inlet channels extending to a plenum and configured to direct coolant to impinge upon a joint boundary wall, wherein the joint boundary wall contacts the braze joint and partially defines the plenum.

The stator vane as in any of the preceding clauses, wherein the cooling circuit further comprises one or more outlet channels defined in the joint boundary wall and in fluid communication with the plenum.

The stator vane as in any of the preceding clauses, wherein each outlet channel of the one or more outlet channels is offset from each inlet channel of the one or more inlet channels both radially and in a direction that extends along a perimeter of the protrusion.

The stator vane as in any of the preceding clauses, wherein the platform includes an inner wall, an outer wall, and a raised wall extending between the inner wall and the outer wall, wherein the braze joint is disposed between and fixedly couples the raised wall of the platform to the protrusion of the airfoil.

The stator vane as in any of the preceding clauses, wherein the one or more inlet channels, the one or more outlet channels, and the plenum are defined in the raised wall and the inner wall of the platform.

The stator vane as in any of the preceding clauses, wherein the cooling circuit is defined in the protrusion.

The stator vane as in any of the preceding clauses, wherein the protrusion of the airfoil includes a leading edge portion, a trailing edge portion, a pressure side portion, and a suction side portion, and wherein the cooling circuit comprises a cooling passage extending from an inlet at the leading edge portion to an outlet defined in one of the trailing edge portion, the pressure side wall, or the suction side wall.

The stator vane as in any of the preceding clauses, wherein the stator vane defines a cavity, wherein an insert is coupled to the protrusion and extends into the cavity, and wherein a cap is coupled to the protrusion and extends across the cavity.

The stator vane as in any of the preceding clauses, wherein the cap and the insert define an outlet plenum within the cavity of the stator vane, wherein the cooling circuit is in fluid communication with the outlet plenum.

The stator vane as in any of the preceding clauses, wherein an annular plenum is defined between the insert and a wall of the airfoil, and wherein the annular plenum is fluidly coupled to the outlet plenum via an insert aperture.

According to another aspect, a turbomachine comprises: a compressor section; a combustion section; and a turbine section comprising at least one stator vane, wherein the at least one stator vane comprises: a platform defining an opening; an airfoil having a leading edge, a trailing edge, a suction side wall, and a pressure side wall, the airfoil extending radially between a base and a tip, wherein at least one of the base or the tip includes a protrusion, the protrusion extending into the opening of the platform such that the platform surrounds the protrusion of the airfoil; a braze joint disposed between and fixedly coupling the platform and the protrusion of the airfoil; and a cooling circuit defined in at least one of the protrusion or the platform to cool the braze joint.

The turbomachine as in any of the preceding clauses, wherein the cooling circuit comprises one or more inlet channels extending to a plenum and configured to direct coolant to impinge upon a joint boundary wall, wherein the joint boundary wall contacts the braze joint and partially defines the plenum.

The turbomachine as in any of the preceding clauses, wherein the cooling circuit further comprises one or more outlet channels defined in the joint boundary wall and in fluid communication with the plenum.

The turbomachine as in any of the preceding clauses, wherein each outlet channel of the one or more outlet channels is offset from each inlet channel of the one or more inlet channels both radially and in a direction that extends along a perimeter of the protrusion.

The turbomachine as in any of the preceding clauses, wherein the platform includes an inner wall, an outer wall, and a raised wall extending between the inner wall and the outer wall, wherein the braze joint is disposed between and fixedly couples the raised wall of the platform to the protrusion of the airfoil.

The turbomachine as in any of the preceding clauses, wherein the one or more inlet channels, the one or more outlet channels, and the plenum are defined in the raised wall and the inner wall of the platform.

The turbomachine as in any of the preceding clauses, wherein the cooling circuit is defined in the protrusion.

The turbomachine as in any of the preceding clauses, wherein the protrusion of the airfoil includes a leading edge portion, a trailing edge portion, a pressure side portion, and a suction side portion, and wherein the cooling circuit comprises a cooling passage extending from an inlet at the leading edge portion to an outlet defined in one of the trailing edge portion, the pressure side wall, or the suction side wall.

The turbomachine as in any of the preceding clauses, wherein the stator vane defines a cavity, wherein an insert is coupled to the protrusion and extends into the cavity, and wherein a cap is coupled to the protrusion and extends across the cavity.

What is claimed is:

1. A stator vane comprising:
a platform defining an opening;
an airfoil having a leading edge, a trailing edge, a suction side wall, and a pressure side wall, the airfoil extending radially between a base and a tip, wherein at least one of the base or the tip includes a protrusion, the protrusion extending into the opening of the platform such that the platform surrounds the protrusion of the airfoil;
a braze joint disposed between and fixedly coupling the platform and the protrusion of the airfoil; and
a cooling circuit defined in the platform to cool the braze joint, the cooling circuit including one or more inlet channels, one or more outlet channels, and a plenum fluidly coupled to the one or more inlet channels and the one or more outlet channels defined entirely in the platform.

2. The stator vane as in claim 1, wherein the one or more inlet channels extend to the plenum and are configured to direct coolant to impinge upon a joint boundary wall, wherein the joint boundary wall contacts the braze joint and partially defines the plenum.

3. The stator vane as in claim 2, wherein the one or more outlet channels are defined in the joint boundary wall and are in fluid communication with the plenum.

4. The stator vane as in claim 1, wherein each outlet channel of the one or more outlet channels is offset from each inlet channel of the one or more inlet channels both radially and in a direction that extends along a perimeter of the protrusion.

5. The stator vane as in claim 1, wherein the platform includes an inner wall, an outer wall, and a raised wall extending between the inner wall and the outer wall, wherein the braze joint is disposed between and fixedly couples the raised wall of the platform to the protrusion of the airfoil.

6. The stator vane as in claim 5, wherein the one or more inlet channels, the one or more outlet channels, and the plenum are defined in the raised wall and the inner wall of the platform.

7. A turbomachine comprising:
a compressor section;
a combustion section; and a turbine section comprising at least one stator vane, wherein the at least one stator vane comprises:

a platform defining an opening;

an airfoil having a leading edge, a trailing edge, a suction side wall, and a pressure side wall, the airfoil extending radially between a base and a tip, wherein at least one of the base or the tip includes a protrusion, the protrusion extending into the opening of the platform such that the platform surrounds the protrusion of the airfoil;

a braze joint disposed between and fixedly coupling the platform and the protrusion of the airfoil; and a cooling circuit defined in the platform to cool the braze joint, the cooling circuit including one or more inlet channels, one or more outlet channels, and a plenum fluidly coupled to the one or more inlet channels and the one or more outlet channels defined entirely in the platform.

8. The turbomachine as in claim 7, wherein the one or more inlet channels extend to the plenum and are configured to direct coolant to impinge upon a joint boundary wall, wherein the joint boundary wall contacts the braze joint and partially defines the plenum.

9. The turbomachine as in claim 8, wherein the one or more outlet channels are defined in the joint boundary wall and are in fluid communication with the plenum.

10. The turbomachine as in claim 7, wherein each outlet channel of the one or more outlet channels is offset from each inlet channel of the one or more inlet channels both radially and in a direction that extends along a perimeter of the protrusion.

11. The turbomachine as in claim 7, wherein the platform includes an inner wall, an outer wall, and a raised wall extending between the inner wall and the outer wall, wherein the braze joint is disposed between and fixedly couples the raised wall of the platform to the protrusion of the airfoil.

12. The turbomachine as in claim 11, wherein the one or more inlet channels, the one or more outlet channels, and the plenum are defined in the raised wall and the inner wall of the platform.

13. A stator vane comprising:

a platform defining an opening;

an airfoil having a leading edge, a trailing edge, a suction side wall, and a pressure side wall, the airfoil extending radially between a base and a tip, wherein at least one of the base or the tip includes a protrusion, the protrusion extending into the opening of the platform such that the platform surrounds the protrusion of the airfoil;

a braze joint disposed between and fixedly coupling the platform and the protrusion of the airfoil; and a cooling circuit defined in the platform to cool the braze joint, wherein the cooling circuit comprises one or more inlet channels extending to a plenum and configured to direct coolant to impinge upon a joint boundary wall, wherein the joint boundary wall contacts the braze joint and partially defines the plenum, and wherein each outlet channel of one or more outlet channels is fluidly coupled to the plenum and is offset from each inlet channel of the one or more inlet channels both radially and in a direction that extends along a perimeter of the protrusion.

* * * * *